Patented June 5, 1934

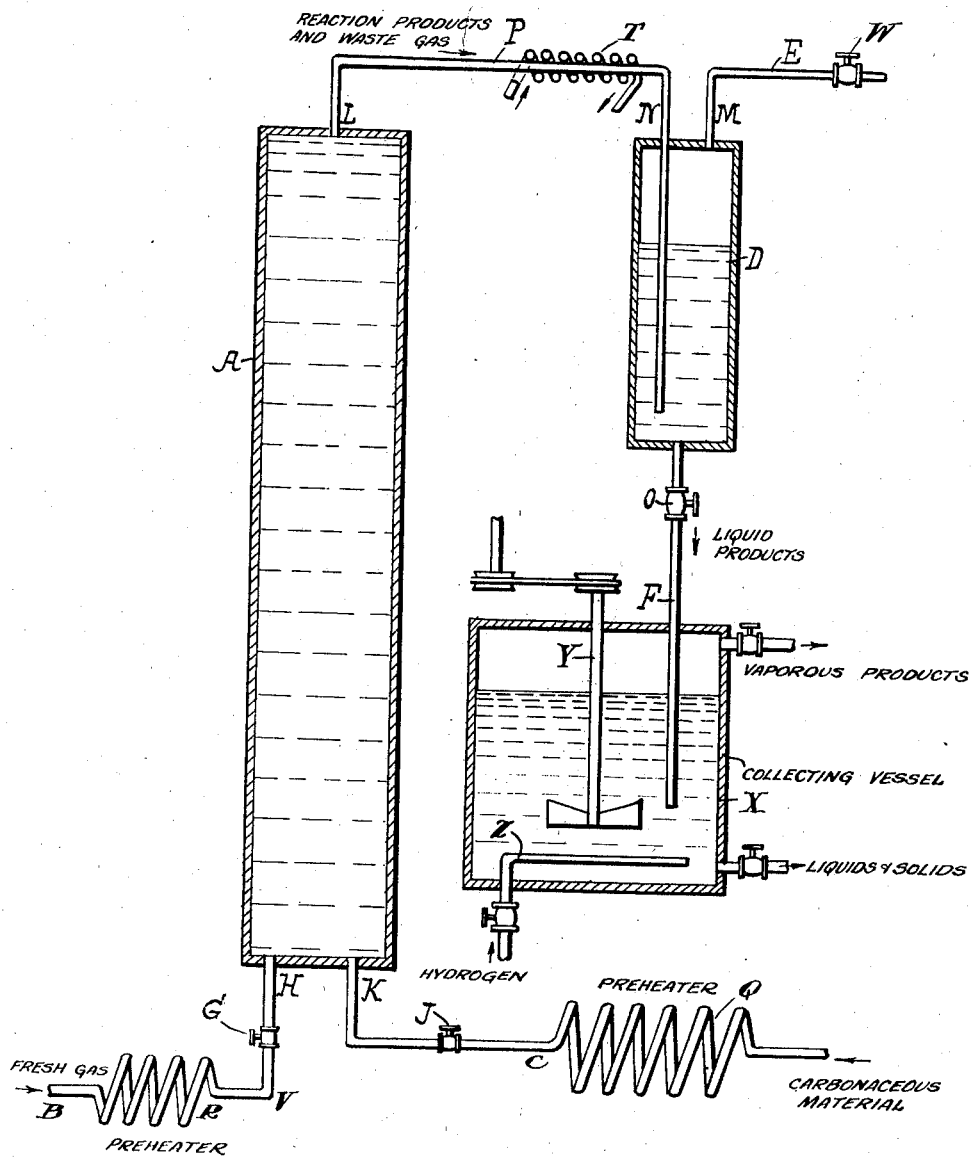

1,961,982

UNITED STATES PATENT OFFICE 1,961,982

RECOVERY OF THE REACTION PRODUCTS OF THE DESTRUCTIVE HYDROGENATION OF CARBONACEOUS MATERIALS

Mathias Pier, Heidelberg, and Karl Winkler, Ludwigshafen-on-the-Rhine, Germany, assignors, by mesne assignments, to Standard-I. G. Company, Linden, N. J., a corporation of Delaware Application May 20, 1929, Serial No. 364,459
In Germany May 25, 1928

5 Claims. (Cl. 196—53)

This invention relates to improvements in the recovery of the reaction products of the destructive hydrogenation of distillable carbonaceous materials.

In the destructive hydrogenation of distillable carbonaceous materials, such as the various kinds of coal, tars, mineral oils, the extraction, conversion and distillation products thereof and the like, for the purpose of producing valuable liquid hydrocarbon products, residues are formed which consist of mixtures of solid, coaly and ash-like constituents and heavy oils, and these residues readily lead to clogging of and incrustations in the valves and conduits. In order to render the process inexpensive and simple it is carried out under such conditions that the least possible quantity of solid residue arises. Since in order to obtain large yields of liquid products high temperatures and flowing hydrogen are frequently employed, the liquid products obtained are almost entirely carried away from the reaction vessel in the form of vapor, so that a drying of the residue takes place in the reaction chamber or in the adjacent parts of the apparatus. In the removal of these dried residues great difficulties are frequently encountered in practice.

We have now found that it is advantageous to operate in such a manner, that the reaction products consisting of mixtures of liquid products and solid residues, if desired, together with the excess of hydrogen present, are transferred from the reaction vessel into a separator, without any substantial release of pressure, from which vaporous reaction products are removed only to such an extent that sufficient liquid products remain in the residues to render the withdrawal of the said residues convenient and easy. In this way the viscosity of the product at the reaction temperature is usually maintained at between about that of water and of a lubricating oil at room temperature.

Oils having a high boiling point range, which are particularly stable, as regards decomposition, may, for example, be added to the initial materials in order to facilitate the transfer of the reaction products from the reaction chamber to the separator and the removal of the residues from the latter. When coal is made up into a paste with oils of the nature of middle oil, care is taken by means of cooling at a suitable place, preferably with the recovery of the heat, that as much liquid product is condensed from the reaction product which is escaping in the form of vapor and mixed with the solid residues in the reaction vessel or separator, as is necessary for the withdrawal of the residues and for preventing the drying in of the reaction products. The temperature in the reaction chamber and in the stripping vessel must be so regulated that the vapor tension of the liquid products is not too great. Moreover, wetting agents such as aqueous solutions of sulphonic acids or their salts and the like may be added to the residues. If the products to be withdrawn be too thinly liquid the whole of the mass to be withdrawn may be brought to the necessary consistency by cooling immediately before withdrawal. When withdrawing the products the formation of layers may readily occur by reason of the settling of the solid or semi-solid materials, for example the asphaltic materials, and this may be disadvantageous for the further working up of the products. This may be avoided, for example, by withdrawing the products into a collecting vessel in which a separation of the solid or viscous materials is prevented, by suitable means such as stirring, or injecting hydrogen, or other means of agitation, or adding substances which have an emulsifying or a solvent action. The pressure may, if desired, be released, wholly or in part prior to the introduction of the liquid and solid products into the collecting vessel.

Moreover, care should be taken that the residues are removed from the separator without the evolution of gases or vapors and also that no gases or vapors flow out at the same time, because it has been found that by these precautions the wearing of the constructional material, in particular the wearing of the valves is very greatly reduced. The reason for the ready occurrence of the flowing out of gases and vapors is that at the elevated temperatures the hydrocarbons are in part present in the gaseous state, or if they are liquid they are converted into the form of vapor when the pressure is released; dissolved gases, for example hydrogen, may also be set free when the pressure is released. In order that the liquid hydrocarbons shall not be able to evolve gases or vapors when the pressure is released the products which are to be withdrawn may be cooled slightly, for example, before being withdrawn.

The pressures employed in the process may vary considerably. Thus any pressures above atmospheric may be employed, for example, pressures of 5, 10 or 20 atmospheres, but preferably higher pressures, such for example as 50, 100, 200 atmospheres or even more, for example, even 1000 atmospheres. These pressures are substantially maintained in the separator referred to above. As a rule the higher the temperatures, the higher will be the pressures necessary for maintaining the requisite amount of liquid products in the residues to be removed. On the other hand the higher the temperature, the more mobile will the product under treatment be.

The reaction will be further illustrated with reference to the accompanying drawing, which illustrates one form of apparatus for carrying out the process according to the present invention although it should be understood that the invention is not restricted thereto.

A is a high pressure reaction vessel for carrying out the destructive hydrogenation of carbonaceous materials, the hydrogenating gas being introduced thereinto at B, preheated in the preheater R and passed through the pipe V controlled by the valve G. The carbonaceous material to be treated is introduced into the reaction vessel at K, through the preheater Q and the pipe C controlled by the valve J. The reaction products together with the surplus hydrogenating gases are removed from the reaction vessel at L by way of the pipe P cooled by means of the cooling coil T and are introduced into the separator D at N. The vaporous products are removed from the separator together with the gases at M by way of the pipe E controlled by valve W, only to such an extent that sufficient liquid products remain in the residues to render their removal from the separator by way of the pipe F controlled by the valve O convenient and easy. A cooler (not shown) is usually attached to line 2 before valve W. The pipe F delivers the mixture of liquids and solids from vessel D to cooling vessel X, which is provided with an agitator Y and/or with a perforated ring Z of the conventional type through which hydrogen may be injected in a number of small streams into the material in vessel X. The hydrogen injector and the agitator may be employed separately or together. The cooling vessel X is also provided with a pipe through which liquids and solids may be withdrawn and a pipe through which any vaporous products may be withdrawn.

The following example will further illustrate how the invention may be carried out in practice, but the invention is not restricted thereto.

*Example*

1,000 kilograms of dried brown coal are inely ground and made into a paste with 1,000 kilograms of a heavy residual oil obtained in the destructive hydrogenation of coal and the mixture is treated with hydrogen under a pressure of about 200 atmospheres and at a temperature of from about 460° to 480° C. in a high pressure reaction vessel in the presence of a catalyst comprising molybdic acid and zinc oxide. The whole of the reaction product passes into a separator at the rear of the said vessel and here the gas and the vaporized hydrocarbons are separated from the solid residues and the unvaporized oil. With a throughput of gas of about 4,000 cubic meters per hour the temperature of the separator is maintained at from about 400° to 410° C. Under these conditions about 1110 kilograms of oil are obtained as a distillate which is separated from the gas in a condenser, and about 600 kilograms of a sludge containing from 37 to 38 per cent of solid constituents are also obtained. From this sludge about 365 kilograms of oil are recovered, so that altogether a yield of oil of about 475 kilograms is obtained. If the temperature of the separator is kept too high, more oil is vaporized and a sludge arises which is very rich in solid residues and this in some cases gives rise to difficulties in withdrawal. On the other hand if the temperature is kept too low a part of the more readily volatile constituents condenses and a thin sludge is formed. For the further working up of the sludge however it is very important that it should always be obtained with a uniform composition. This is ensured by a most careful regulation of the temperature of the separator and of the throughput of the gas.

What we claim is:—

1. A process for the recovery of the reaction products consisting of liquid products and solid residues obtained by the destructive hydrogenation of carbonaceous materials under a pressure of at least 50 atmospheres, said reaction products being such that a substantial release of the pressure employed in the destructive hydrogenation at the temperature employed would result in the vaporization of the greater portion of the liquids contained therein and the formation of a difficultly flowable residue, comprising transferring said reaction products from the reaction vessel to a separator without any substantial release of the pressure employed in the reaction vessel and without a drop in temperature of substantially more than 80° C. and removing vaporous products only to such an extent that sufficient liquid products remain in the residue to render it readily flowable.

2. A process for the recovery of the reaction products consisting of liquid products and solid residues obtained by the destructive hydrogenation of carbonaceous materials under a pressure of at least 50 atmospheres, said reaction products being such that a substantial release of the pressure employed in the destructive hydrogenation at the temperature employed would result in the vaporization of the greater portion of the liquids contained therein and the formation of a difficultly flowable residue, comprising transferring said reaction products from the reaction vessel to a separator without any substantial release of the pressure employed in the reaction vessel and without a drop in temperature of substantially more than 80° C. and removing vaporous products only to such an extent that sufficient liquid products remain in the residue to impart to it at the temperature of operation a viscosity lying between that of water and that of lubricating oil at room temperature.

3. A process for the recovery of the reaction products consisting of liquid products and solid residues obtained by the destructive hydrogenation of carbonaceous materials under a pressure of at least 50 atmospheres, said reaction products being such that a substantial release of the pressure employed in the destructive hydrogenation at the temperature employed would result in the vaporization of the greater portion of the liquids contained therein and the formation of a difficultly flowable residue, comprising transferring said reaction products from the reaction vessel to a separator without any substantial release of the pressure employed in the reaction vessel and without a drop in temperature of substantially more than 80° C. and removing vaporous products only to such an extent that about 62% of liquid products remain in the residue, thereby rendering it readily flowable.

4. A process for the recovery of the reaction products consisting of liquid products and solid residues obtained by the destructive hydrogenation of carbonaceous materials under a pressure of at least 50 atmospheres, said reaction products being such that a substantial release of the pressure employed in the destructive hydrogenation at the temperature employed would result in the vaporization of the greater portion of the liquids contained therein and the formation of a difficultly flowable residue, comprising transferring said reaction products from the reaction vessel to a separator without any substantial release of the pressure employed in the reaction vessel and without a drop in temperature of substantially more than 80° C., avoiding the evolution of gases and vapors during the removal of the residues from the separator and removing vaporous products only to such an extent that sufficient liquid products remain in the residue to render it readily flowable.

5. A process for the recovery of the reaction products consisting of liquid products and solid residues obtained by the destructive hydrogenation of carbonaceous materials under a pressure of about 200 atmospheres and a temperature of about 460° to 480° C., said reaction products being such that a substantial release of the pressure employed in the destructive hydrogenation at the temperature employed would result in the vaporization of the greater portion of the liquids contained therein and the formation of a difficultly flowable residue, comprising transferring said reaction products from the reaction vessel to a separator maintained at about 400° to 410° without any substantial release of the pressure employed in the reaction vessel and removing vaporous products only to such an extent that about 62% of the liquid products remain in the residue, thereby rendering it readily flowable.

MATHIAS PIER.
KARL WINKLER.